L. BRANDEIS.
Valve for Faucets.
No. 230,173. Patented July 20, 1880.
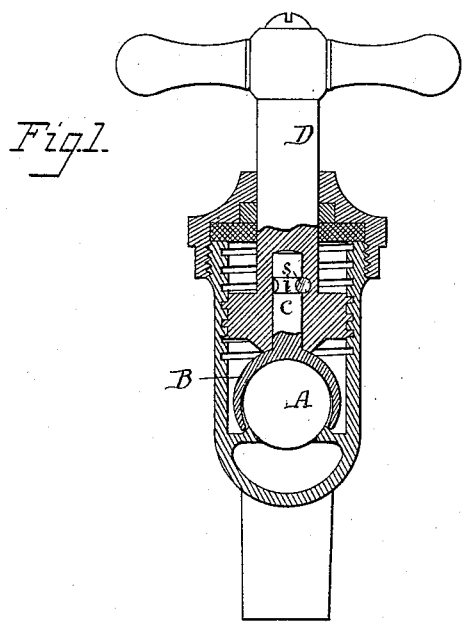
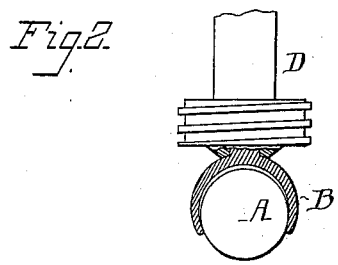

UNITED STATES PATENT OFFICE.

LUDWIG BRANDEIS, OF BROOKLYN, NEW YORK.

VALVE FOR FAUCETS.

SPECIFICATION forming part of Letters Patent No. 230,173, dated July 20, 1880.

Application filed February 26, 1880.

*To all whom it may concern:*

Be it known that I, LUDWIG BRANDEIS, of Brooklyn, Kings county, New York, have invented an Improvement in Valves for Faucets, &c., of which the following is a specification.

My invention is a valve for faucets and other purposes, constructed, as fully described hereinafter, so as to utilize the advantages of a sphere or ball without the objections heretofore incident to its employment.

In the drawings forming a part of this specification, Figure 1 is a section of a faucet constructed in accordance with my invention, and Fig. 2 a section of the valve-holder with its valve.

An objection to the employment of balls or spheres fixed to the valve-stems is their liability to become worn unequally, from the fact that they always retain the same position relative to the seat. In some instances loose balls have been used; but in such case the balls frequently become wedged or stuck in their seats, so as not to rise when the spindle is lifted. They further, by their vibrating motion, interfere with the flow of the water.

To overcome these difficulties I combine the ball or sphere A with a stem carrying a holder, B, having a socket of such dimensions and so constructed that, while the sphere will be retained in connection with the stem, it can turn so freely in every direction that it will constantly change its position in its socket by the action of the current of water, so that every time the valve is closed a new surface is presented by the ball to the seat. By this means unequal wear both of valve and seat is prevented, as the ball is free to move in its socket, while, as the spindle acts positively to lift the ball, it cannot become fixed in its seat.

The valve may be made solid or hollow, of any desirable material, elastic or inelastic, and may be connected to the stem so as to turn freely in any suitable manner.

To further avoid all tendency to grind, a socket may be formed in a holder, B, having a stem, $c$, extending into a recess in the valve-spindle, D, and retained by a cross-pin, $s$, extending into an annular groove, $i$, so that the holder can turn independently of the stem while moving vertically with the latter.

I claim—

The combination, in a valve or faucet, of a stem, D, a sphere, A, adapted to a seat, and a holder, B, secured to the spindle and having a socket larger than the sphere, but constructed to retain the latter loosely in connection with the stem, substantially as set forth.

In testimony whereof I have signed my name to this specification in the presence of two subscribing witnesses.

LUDWIG BRANDEIS.

Witnesses:
EDWARD WYMAN, Jr.,
EDW. F. KEATING.